US012568002B2

(12) United States Patent
Hollabaugh et al.

(10) Patent No.: US 12,568,002 B2
(45) Date of Patent: Mar. 3, 2026

(54) SYSTEMS AND METHODS FOR COMMUNICATION OVER A NETWORK

(71) Applicant: Apple Inc., Cupertino, CA (US)

(72) Inventors: James M. Hollabaugh, San Jose, CA (US); Calvin M. Ryan, Denver, CO (US); Mitul Mahendrakumar Panchal, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/653,836

(22) Filed: May 2, 2024

(65) Prior Publication Data

US 2024/0406037 A1      Dec. 5, 2024

Related U.S. Application Data

(60) Provisional application No. 63/470,765, filed on Jun. 2, 2023.

(51) Int. Cl.
| | |
|---|---|
| *H04L 25/02* | (2006.01) |
| *G06F 1/08* | (2006.01) |
| *G06F 1/12* | (2006.01) |
| *H04L 25/03* | (2006.01) |
| *H04L 25/06* | (2006.01) |
| *H04L 27/00* | (2006.01) |

(52) U.S. Cl.
CPC ............ *H04L 25/0272* (2013.01); *G06F 1/08* (2013.01); *G06F 1/12* (2013.01); *H04L 25/03286* (2013.01); *H04L 25/06* (2013.01); *H04L 27/0002* (2013.01)

(58) Field of Classification Search
CPC ........... H04L 25/0272; H04L 25/03286; H04L 25/06; H04L 27/0002; G06F 1/08; G06F 1/12

See application file for complete search history.

(56) References Cited

U.S. PATENT DOCUMENTS

| | | | |
|---|---|---|---|
| 6,476,844 B1 * | 11/2002 | Ream ................. | G06K 15/1204 347/237 |
| 8,401,096 B2 | 3/2013 | Raif | |
| 8,467,485 B2 | 6/2013 | Dai | |
| 8,737,521 B2 * | 5/2014 | Cornelius ................ | H04B 3/26 375/295 |
| 9,705,522 B1 * | 7/2017 | Ng ........................... | H03M 1/66 |
| 9,966,705 B2 * | 5/2018 | Maeda ................. | H01R 13/665 |

(Continued)

*Primary Examiner* — Sophia Vlahos

(74) *Attorney, Agent, or Firm* — BAKERHOSTETLER

(57) ABSTRACT

A host and one or more devices can communicate with each other using signals that couple communication data with power. The host can transmit the coupled data and the other device can decouple the communication data from the power. Further, the receiving device can replicate the transmitted communication signal without digital signal processing. The host and the devices can communicate with each other using a data frame in which one of the devices initially generates a first portion of the data frame and transmits the first portion, and the other device subsequently generates and transmits a second portion of the data frame. The data frame may include one or more frame sync data used to calibrate and align clock signals from clock circuits. Systems and methods for identifying data when a system is unaware of the protocol are also shown.

20 Claims, 15 Drawing Sheets

(56)                    References Cited

U.S. PATENT DOCUMENTS

| | | | | |
|---|---|---|---|---|
| 2007/0098333 A1* | 5/2007 | Gossen | ................ | G02B 6/4214 |
| | | | | 385/88 |
| 2010/0043045 A1* | 2/2010 | Shakiba | ................... | H04B 3/32 |
| | | | | 725/127 |
| 2010/0207676 A1* | 8/2010 | Shih | ................. | H03K 19/00323 |
| | | | | 327/306 |
| 2010/0251326 A1* | 9/2010 | Kamon | ................ | H04N 21/426 |
| | | | | 725/153 |
| 2012/0327250 A1* | 12/2012 | Zhang | ................... | G09G 5/006 |
| | | | | 348/180 |
| 2014/0133529 A1* | 5/2014 | Ding | ................. | H04L 25/03885 |
| | | | | 375/219 |
| 2015/0009984 A1 | 1/2015 | Jung | | |
| 2017/0017595 A1* | 1/2017 | Schnell | ............... | G06F 13/4286 |
| 2017/0125892 A1 | 5/2017 | Arbabian | | |
| 2018/0139530 A1 | 5/2018 | Marrin | | |
| 2023/0089760 A1 | 3/2023 | Ge | | |

* cited by examiner

900

| BUS STATE | TRANSMIT | RECEIVE |
|---|---|---|
| Differential '1' | Drive Data Hi | Detect Up Edge |
| Differential '0' | Drive Data Lo | Detect Down Edge |

SYSTEMS AND METHODS FOR COMMUNICATION OVER A NETWORK

CROSS-REFERENCE TO RELATED APPLICATION(S)

The present application claims the benefit of U.S. Provisional Application No. 63/470,765, entitled "SYSTEMS AND METHODS FOR TRANSFERRING DATA BETWEEN DEVICES," filed Jun. 2, 2023, the content of which is incorporated herein by reference in its entirety for all purposes.

TECHNICAL FIELD

This application is directed to communicating devices and, more particularly, to efficiently transferring data between devices.

BACKGROUND

Devices, such as earbuds and cases for earbuds, can communicate information to each other. While in use, the devices may require periodic updates (e.g., software updates) to provide enhancements or to fix issues. Further, in order to communicate with efficiency and accuracy, cases and an earbud(s) should coordinate communication with each other.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1A:
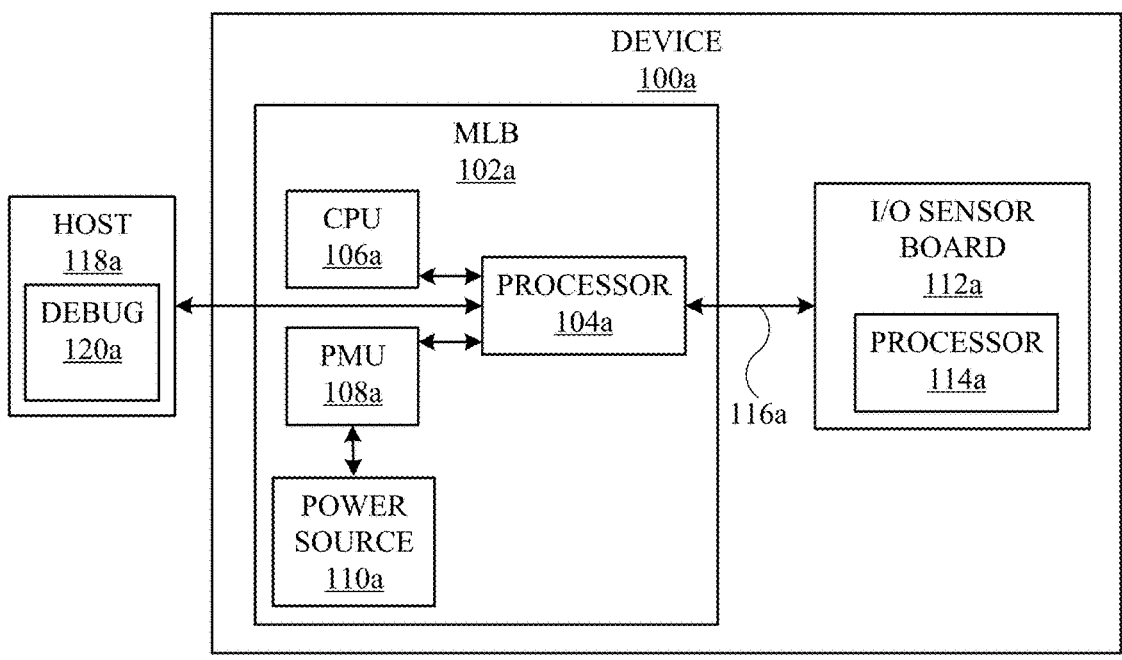
FIG. 1A and FIG. 1B illustrate block diagrams of example electrical networks between a host and a device, in accordance with aspects of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology is directed to data transmission schemes between devices. Example devices may include notebook/laptop computers, tablet computers, headphones, communications device, or other electronic devices with circuitry (e.g., main logic board) for communicating and powering a sensor, such as a camera module, keyboard module, trackpad module, or other input-output (I/O) sensor or user interface module. Exemplary data transmission schemes may include a combination of communication (e.g., data) and power shared between dual subsystems. An example may include headphones, such as earbuds, where power and data is routed between a pair of earbuds. As another example, a combination of communication and power may be exchanged between a host (e.g., a case for earbuds) and one or more separable devices (e.g., earbuds paired with the case), with each of the host and the devices using separate or individual interfaces. As another example, a combination of communication and power may be exchanged between a host and multiple devices using a shared interface.

In one or more implementations, a host receives a high speed signal and transmits the high speed signal to the devices. The host may receive high speed asynchronous signal edges and transmit the high speed signal edges to the device(s) with a fixed latency. The signals may be in accordance with an embedded Universal Serial Bus 2 (eUSB2) specification. The host may include processing circuitry for alternative capacitive (AC) coupling. Using the processing circuitry, the host can convert a differential signal into a single ended signal, which can be AC coupled over a network. This may include coupling power with a data stream. Using a pin-to-pin connection between the host and the earbuds, the earbuds can receive the signal. Further, using similar processing circuitry in the host, the earbuds can recover and replicate the signal. Moreover, the recovery and replication may occur without techniques such as digital sampling or digital processing. Beneficially, the recovered signal is less susceptible to issues such as jitter.

In one or more implementations, the host generates its own data and transmits the data to the earbuds. For example, the host may initiate synchronous bidirectional communication that includes a fixed data frame. The initial part of the data frame includes communication from the host (designated in this example as a leader) to the earbuds (designated in this example as a follower) and the latter part of the data frame includes communication from the earbuds to the host. In this regard, during the initial part of the data frame, the host transmits its own data and the earbuds receive the data, and during the latter part of the data frame, the earbuds transmit its own data and the host receives the data. Although the data frame is fixed (in terms of the interval), characteristics such as bandwidth and run time may be varied. Additionally, the transmitted data can be recovered and replicated directly from the received event without clock recovery (e.g., without the use of a phased locked loop), digital sampling or digital processing. Beneficially, the recovered signal has no added jitter induced from digital sampling from either a related or non-related clock domain. Also, similar to the prior example, power may be coupled with a data stream and subsequently transmitted.

In one or more implementations, the respective processing circuitry in the host and the earbuds can rely on frame sync data in the fixed data frame to synchronize internal clocks. In the data frame, the frame sync data may be generated before and after the (useful) data portion of the data frame. In this regard, when the leader provides the initial part of the data frame to the follower, the follower may use the frame sync data to calibrate (e.g., adjust) several internal clocks (e.g., 32 kilohertz (kHz) oscillator and 125 megahertz (MHz) oscillator). Moreover, the sleep and wake phases of the 32 kHz oscillator may be used to calibrate the active phase of the 125 MHz oscillator, which may be used with other circuitry such as a digital core. The respective frequencies of the clocks are exemplary, and clocks with other frequencies may be used.

In one or more implementations, data, in the form of a bit, may be used to determine whether activity (e.g., additional data) being transmitted is a USB data packet or sideband data (e.g., first in first out (FIFO) data). To implement, the start of a high speed (HS) eUSB data packet may be dropped, based on eUSB specification. During a time interval associated with the dropped portion of the USB data packet, a bit of information is sent followed by a silence window. Based on activity occurring during the silence window, a system may determine whether HS eUSB data or FIFO data is being sent, and whether the data is being sent from a transmitter or being provided to a receiver.

In one or more implementations, a process for determining a high side and a low side of a signal uses a differential "1" and differential "0" to drive, at a transmitter, the data to the high side and the low side, respectively. At a receiver, the high side and the low side are detected as an up edge and a down edge, respectively. As a result, eUSB states may be mapped to what is sent over a system (e.g., single ended system). Further, in one or more implementations, this information, along with phase information, may be used to when a pin transitions from one state to another.

These and other embodiments are discussed below with reference to FIGS. 1-13. However, those skilled in the art will readily appreciate that the detailed description given herein with respect to these Figures is for explanatory purposes only and should not be construed as limiting.

According to some embodiments, for example as shown in FIG. 1A, a device 100a is shown. The device 100a may include a main logic board 102a (MLB). The main logic board 102a may include a processor 104a, a central processing unit 106a (CPU), a power management unit 108a (PMU), and a power source 110a. The device 100a may further include an input-output sensor board 112a (I/O sensor board). The input-output sensor board 112a may include a processor 114a. The processor 104a of the main logic board 102a may be in communication with the input-output sensor board 112a by way of an interface 116a. In one or more implementations, the interface 116a between the main logic board 102a and the input-output sensor board 112a may be used to provide a combination of power (e.g., direct current, or DC, power) and communications (e.g., communication data, frame sync data).

The processor 104a of the main logic board 102a may be in communication with the host 118a. In one or more implementations, the host 118a includes a debugger 120a (DEBUG), thereby allowing the host 118a to provide one or more signals (e.g., test signals) to the device 100a for debugging applications (e.g. software debugging). In one or more implementations, the host 118a may provide USB data, including eUSB2 data. The eUSB2 data may include a differential signal from an eUSB2 data stream represented by electrical states eD+ and eD− on a respective data line.

Figure 1B:
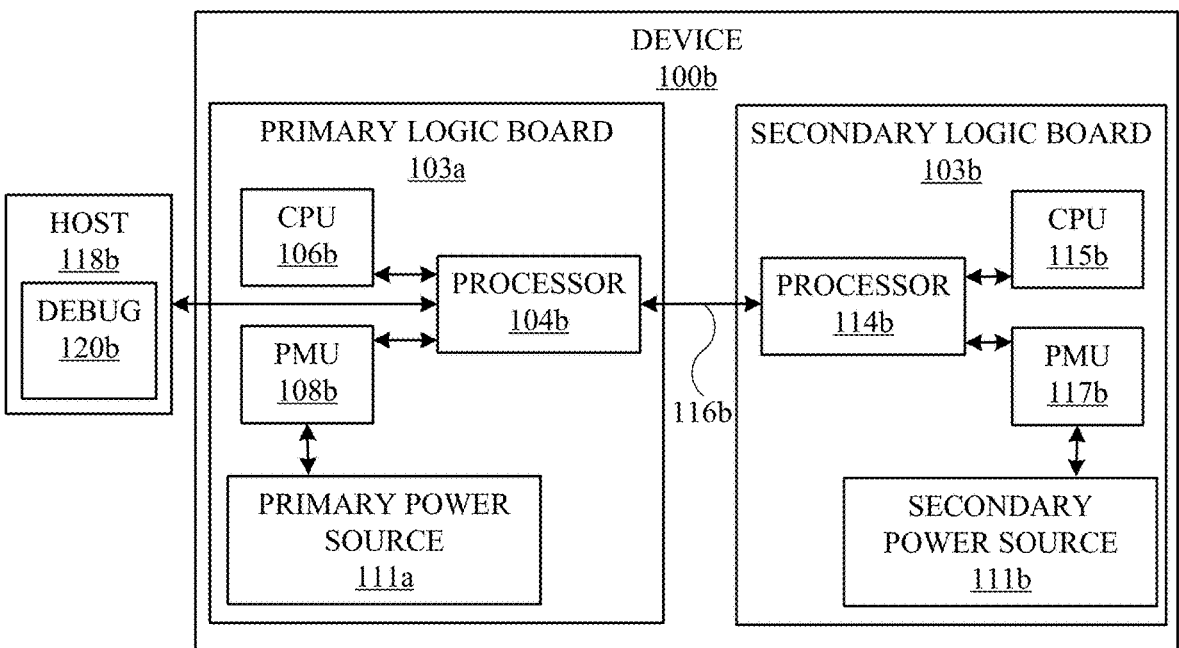

Referring to FIG. 1B, a device 100b is shown. The device 100a may include a primary logic board 103a and a secondary logic board 103b. The primary logic board 103a may include a processor 104b, a central processing unit 106b (CPU), a power management unit 108b (PMU), and a primary power source 111a. The secondary logic board 103b may be referred to as a subsystem board. The secondary logic board 103b may include a processor 114b, a central processing unit 115b (CPU), a power management unit 117b (PMU), and a secondary power source 111b. The processor 104a of the primary logic board 103a may be in communication with the processor 114b of the secondary logic board 103b by way of an interface 116b. In one or more implementations, the interface 116b between the primary logic board 103a and the secondary logic board 103b may be used to provide a combination of power (e.g., direct current, or DC, power) and communications (e.g., communication data, frame sync data).

The processor 104a of the primary logic board 103a may be in communication with the host 118b. In one or more implementations, the host 118b includes a debugger 120b (DEBUG), thereby allowing the host 118b to provide one or more signals (e.g., test signals) to the device 100b for debugging applications (e.g. software debugging). In one or more implementations, the host 118b may provide USB data, including eUSB2 data. The eUSB2 data may include a differential signal from an eUSB2 data stream represented by electrical states eD+ and eD− on a respective data line.

Figure 2A:
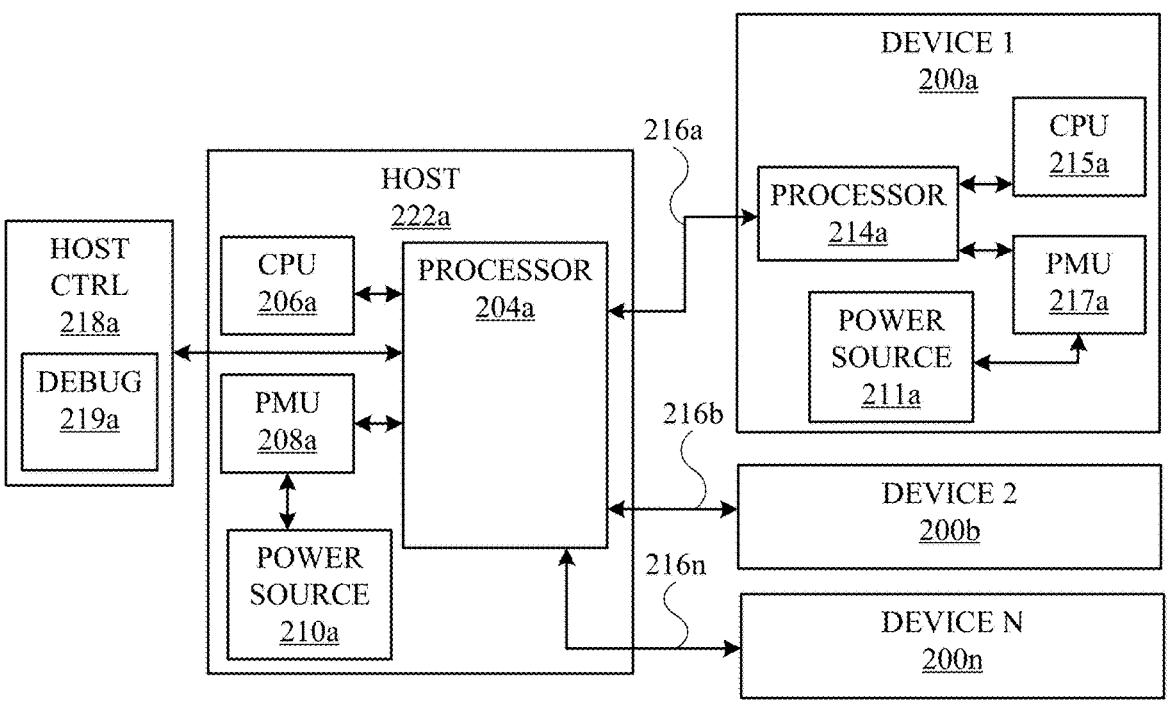
FIGS. 2A and 2B illustrate block diagrams of example electrical networks between a host and multiple devices, in accordance with aspects of the present disclosure.

Referring to FIG. 2A, a host 222a in communication with multiple devices is shown. The host 222a may be in communication with several devices, such as a device 200a (DEVICE 1), a device 200b (DEVICE 1), and a device 200n (DEVICE N), with the device 200n representing a total of n devices where n is an integer of three or greater.

The host 222a may include a processor 204a, a central processing unit 206a (CPU), a power management unit 208a (PMU), and a power source 210a. The device 200a may include a processor 214a, a central processing unit 215a (CPU), a power management unit 217a (PMU), and a power source 211a. The device 200b and the device 200n may include any components and/or features shown and described for the device 200*a*.

The processor 204*a* of the host 222*a* may be in communication with respective processors (e.g., processor 214*a*) of the devices (e.g., device 200*a*, device 200*b*, and device 200*n*) by way of an interface 216*a*, an interface 216*b*, and an interface 216*n*, respectively. The interfaces 216*a*, 216*b*, and 216*n* represent separate or indusial interfaces between the host 226*a* and the devices 200*a*, 200*b*, and 200*n*, respectively. Each of the interfaces 216*a*, 216*b*, and 216*n* may be used to provide a combination of power (e.g., direct current, or DC, power) and communications (e.g., communication data, frame sync data).

The processor 204*a* of the host 222*a* may be in communication with the host controller 218*a* (HOST CTRL). In one or more implementations, the host controller 218*a* includes a debugger 219*a* (DEBUG), thereby allowing the host controller 218*a* to provide one or more signals (e.g., test signals) to the host 222*a* for debugging applications (e.g. software debugging). In one or more implementations, the host controller 218*a* may provide USB data, including eUSB2 data. The eUSB2 data may include a differential signal from an eUSB2 data stream represented by electrical states eD+ and eD− on a respective data line. The host 226*a* may communicate signals received from the host controller 218*a* to the devices 200*a*, 200*b*, and 200*n* using the interfaces 216*a*, 216*b*, and 216*n*, respectively.

Figure 2B:
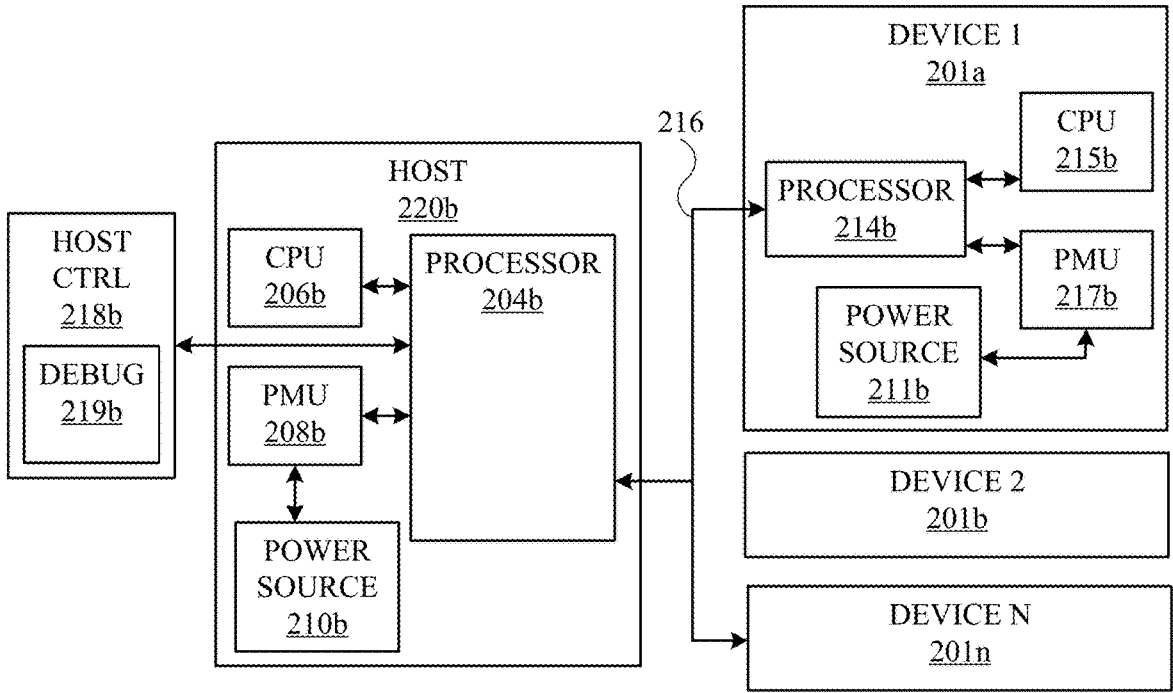

Referring to FIG. 2B, a host 222*b* in communication with multiple devices is shown. The host 222*b* may be in communication with several devices, such as a device 201*a* (DEVICE 1), a device 201*b* (DEVICE 1), and a device 201*n* (DEVICE N), with the device 201*n* representing a total of n devices where n is an integer of three or greater.

The host 222*b* may include a processor 204*b*, a central processing unit 206*b* (CPU), a power management unit 208*b* (PMU), and a power source 210*b*. The device 201*a* may include a processor 214*b*, a central processing unit 215*b* (CPU), a power management unit 217*b* (PMU), and a power source 211*b*. The device 201*b* and the device 201*n* may include any components and/or features shown and described for the device 201*a*.

The processor 204*b* of the host 222*b* may be in communication with respective processors (e.g., processor 214*b*) of the devices (e.g., device 201*a*, device 201*b*, and device 201*n*) by way of an interface 216. The interface 216 may represent a shared interface between the host 226*b* and the devices 201*a*, 201*b*, and 201*n*.

The processor 204*b* of the host 222*b* may be in communication with the host controller 218*b* (HOST CTRL). In one or more implementations, the host controller 218*b* includes a debugger 219*b* (DEBUG), thereby allowing the host controller 218*b* to provide one or more signals (e.g., test signals) to the host 222*a* for debugging applications (e.g. software debugging). In one or more implementations, the host controller 218*a* may provide USB data, including eUSB2 data. The eUSB2 data may include a differential signal from an eUSB2 data stream represented by electrical states eD+ and eD− on a respective data line. The host 226*a* may communicate signals received from the host controller 218*b* to the devices 200*a*, 200*b*, and 200*n* using the interfaces 216*a*, 216*b*, and 216*n*, respectively.

Figure 3:
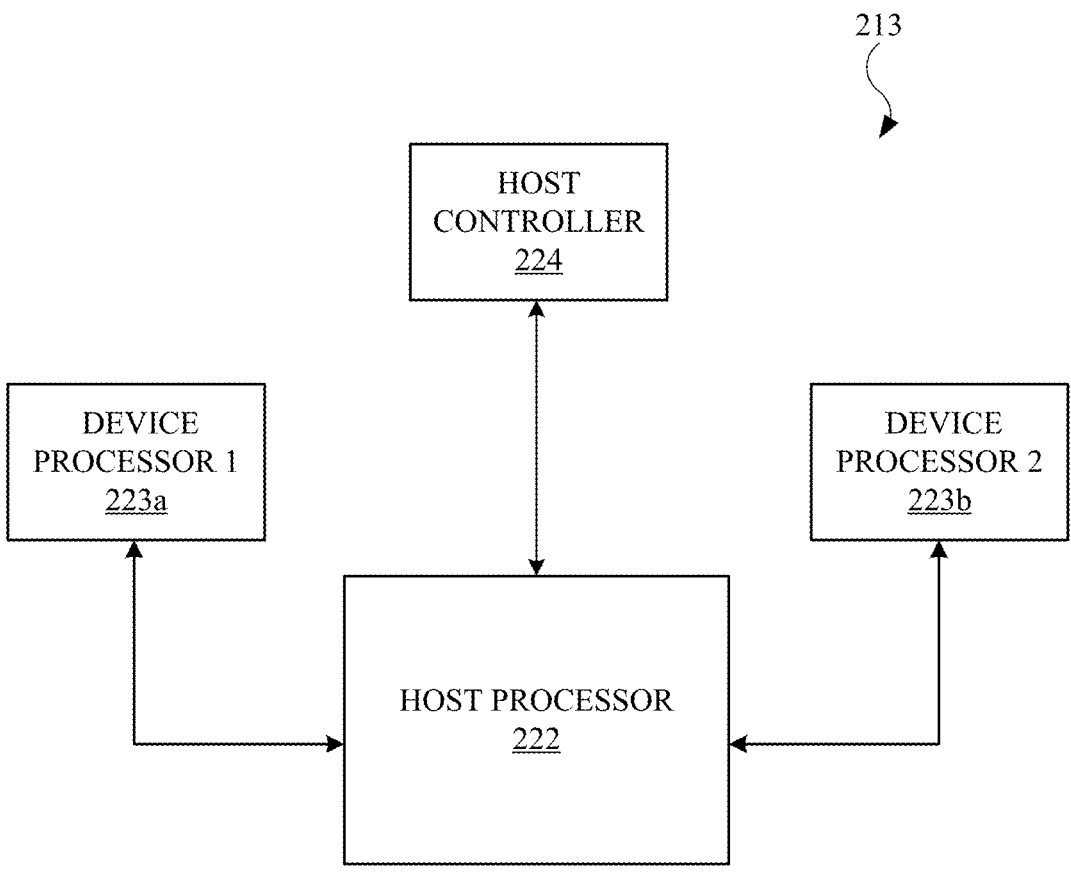
FIG. 3 illustrates a block diagram illustrating an example of an environment within which the subject technology is implemented, in accordance with aspects of the present disclosure.

Referring to FIG. 3, a block diagram illustrating an example of an environment 213 shown. The environment 213 may include a host processor 221, a device processor 223*a* (DEVICE PROCESSOR 1), a device processor 223*b* (DEVICE PROCESSOR 2), and a host controller 224 Non-limiting examples of the devices with the device processors 223*a* and 223*b* includes a mobile wireless communication device such as a smartphone or a tablet, a laptop, a home assistant, or desktop computer. Accordingly, the host controller 224 may be equipped with wireless radio communication. In this manner, the host processor 221, the device processors 223*a* and 223*b*, and the host controller 224 can wirelessly communicate with each other. Also, the host processor 221 may include interface circuits, each with pair of ports, designed to establish a wired communication with respective ports and interface circuits of the device processors 223*a* and 223*b*. The host processor 221 can be charged from a port (e.g., a universal serial bus (USB)) of the host controller 224 or any other device or from a power line.

Communication between the host processor 221 and the device processors 223*a* and 223*b* may include respective power and communication interfaces in which a combination power and communication is transmitted and received. The host processor 221 and the host controller 224 may communicate through high speed data, including high speed eUSB2 data, through an interface. For example, the communication may include asynchronous pin replicated interface from an eUSB2 data stream represented by electrical states eD+ and eD− on a respective data line.

Alternatively, the host controller 224 may connect to the host processor 221 via a wired connection using an interface, which may include one or more wires. This may be used for providing test signals to the host processor 221 or receiving response signals from the host processor 221, including response signals provided by the device processor 223*a* and/or the device processor 223*b*.

Figure 4:
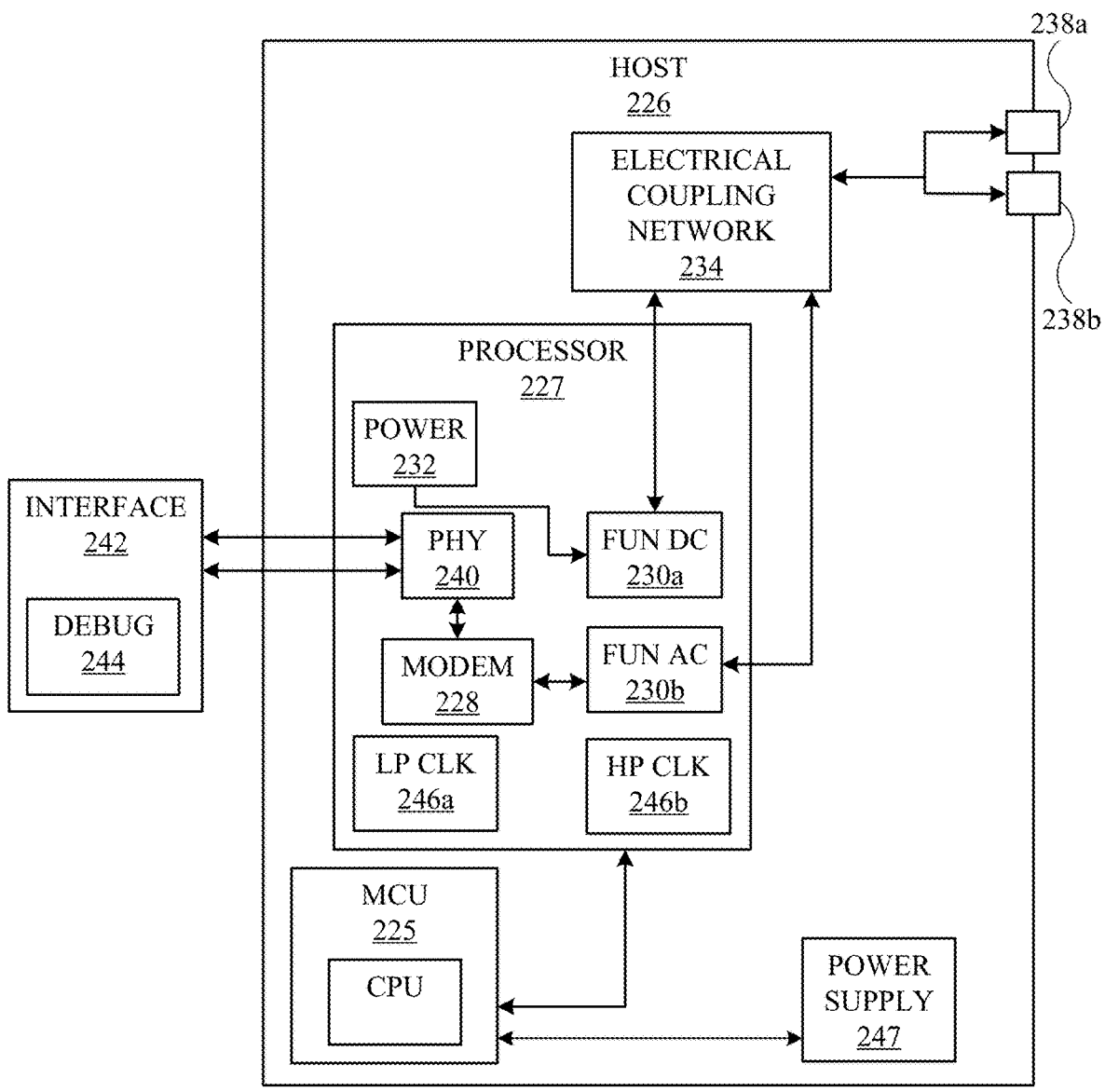
FIG. 4 illustrates a block diagram showing a host and various circuitry components, in accordance with aspects of the present disclosure.

Referring to FIG. 4, a block diagram of a host 226 is shown. In one or more implementations, the host 226 takes the form of a host. Alternatively, in one or more implementations, the host 226 takes the form of an earbud. Accordingly, cases and earbuds shown and/or described herein may include the components shown and described herein for the host 226.

As shown, the host 226 includes a microcontroller unit 225 (MCU). The microcontroller unit 222 may include a central processing unit (CPU) designed to manage several functions of the host 226.

The host 226 may further include a processor 227 designed to manage several communication-related functions of the host 226, including communication with earbuds (when the host 226 takes the form of a case) or including communication with a case (when the host 226 takes the form of an earbud). The processor 227 may take the form of an integrated circuit designed to carry out various functions. The processor 227 may include a modem 228 for transmitting and receiving data streams. The host 226 may further include an electrical coupling network 234. The processor 227 may further include multiple functional buses. For example, the processor 227 may include a functional bus 230*a* (FUN DC) used for transferring power between the host 226 and a device (not shown in FIG. 4). The functional bus 230*a* may provide a DC power path into the electrical network. In this regard, the processor 227 may further include a power source 232, which may include a DC power source. The processor 227 may also include a functional bus 230*b* (FUN AC) that provides a communication path for transferring information between the host 226 and a device. Thus, the processor 227 may provide two separate communication paths into the electrical coupling network 234 based on the functional buses 230*a* and 230*b*.

The host 226 may further include pins, including a pin 238*a* (e.g., signal pin) and a pin 238*b* (e.g., ground pin). The pins 238*a* and 238*b* may provide a multi-pin interface between the host 226 and another device that includes a similar multi-pin interface. In one or more implementations, the processor 227 converts a differential signal into a single ended signal, and uses the electrical coupling network 234 to couple the single ended signal (e.g., communication data) with power. The processor 227 may output the single ended signal. A current state of the single ended signal may be represented by a current state of the pins 238a and 238b.

The processor 227 may further include a physical layer 240 (PHY). During operation of the host 226, the physical layer 240 may receive data streams from an interface 242 (external to the host 226, as shown in FIG. 4). The interface 242 may provide USB data, including eUSB2 data. In this regard, the physical layer 240 may include an eUSB2 physical layer. In one or more implementations, the interface 242 includes a debugger 244 (DEBUG), thereby allowing the interface 242 to provide test signals to the host 226 for debugging applications (e.g. software debugging).

During operation, the modem 228 receives data streams from the physical layer 240 and provides the data streams to the functional bus 230b, while the functional bus 230a provides power. The data streams and the power may be AC coupled and passed through the pins 238a and 238b to another device. When the host 226 is a case, the coupled signal is sent to respective pins of the earbuds.

The processor 227 may further include several clocks. For example, the processor 227 may include one or more clock circuits, such as a low power clock circuit 246a (LP CLK) and a high power clock circuit 246b circuit (HP CLK), each of which may be used for clock signals. As non-limiting examples, the low power clock circuit 246a may operate at 32 kHz and the high power clock circuit 246b may operate at 125 MHz. Accordingly, the high power clock circuit 246b operates at a frequency greater than that of the low power clock circuit 246a.

Additionally, the host 226 may include a power supply 247 used to supply power to the various circuitry of the host 226. In one or more implementations, the power supply 247 includes a battery, such as a rechargeable battery. When the host 226 takes the form of a case, the power supply 247 may be used to charge respective batteries in earbuds.

Figure 5A:
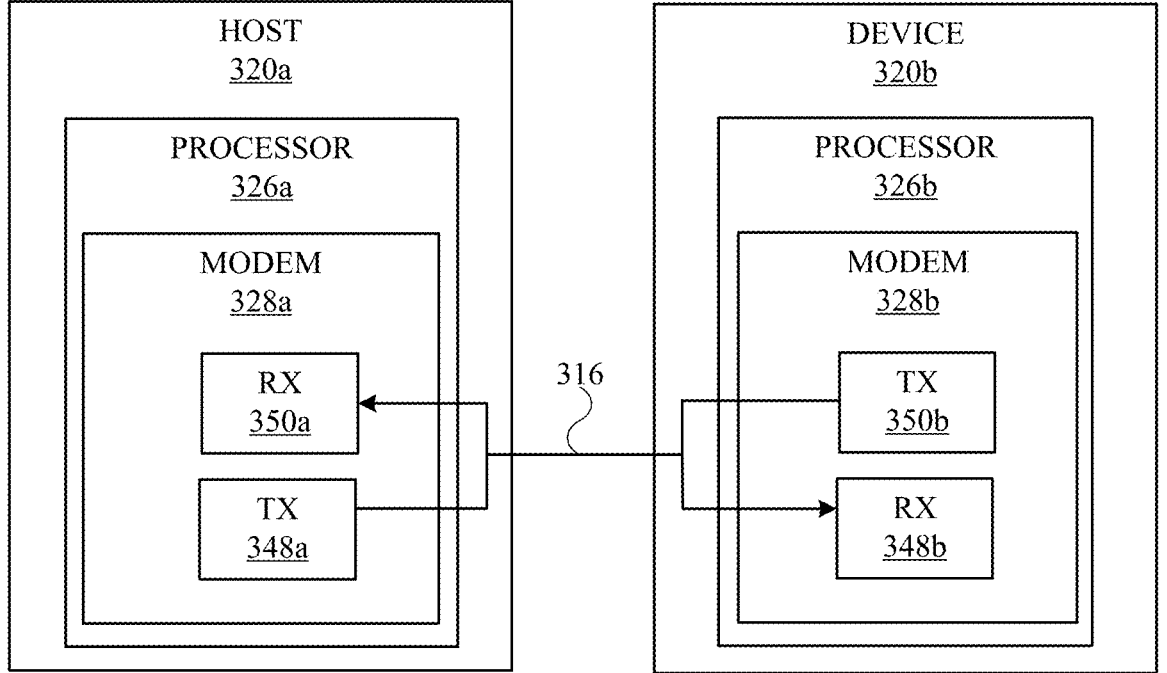
FIG. 5A illustrates a block diagram showing devices with respective modems in communication, in accordance with aspects of the present disclosure.

Referring to FIG. 5A, a host 320a and a device 320b are in communication with each other. The host 320a and the device 320b may include any features shown and described for the host 226 (shown in FIG. 4). In this regard, the host 320a and the device 320b may include a processor 326a and a processor 326b, respectively. In one or more implementations, each of the processor 326a and 326b takes the form of an integrated circuit. with the processor 326a and the processor 326b having a modem 328a and a modem 328b, respectively. Each of the processors 326a and 326b may take the form of an integrated circuit. As shown, each of the modems 328a and 328b includes a transmitter and a receiver. For example, the modem 328a and the modem 328b include a transmitter 348a and a transmitter 348b, respectively, and the modem 328a and the modem 328b include a receiver 350a and a receiver 350b, respectively. In one or more implementations, each of the modems 328a and 328b functions as an asynchronous modem. Based on their respective circuitry components, the host 320a and the device 320b can communicate with each other in the form of data streams, including data streams coupled with power. In one or more implementations, an interface 316 is used to communicate power and communication data over the same signal between the host 320a and the device 320b.

Figure 5B:
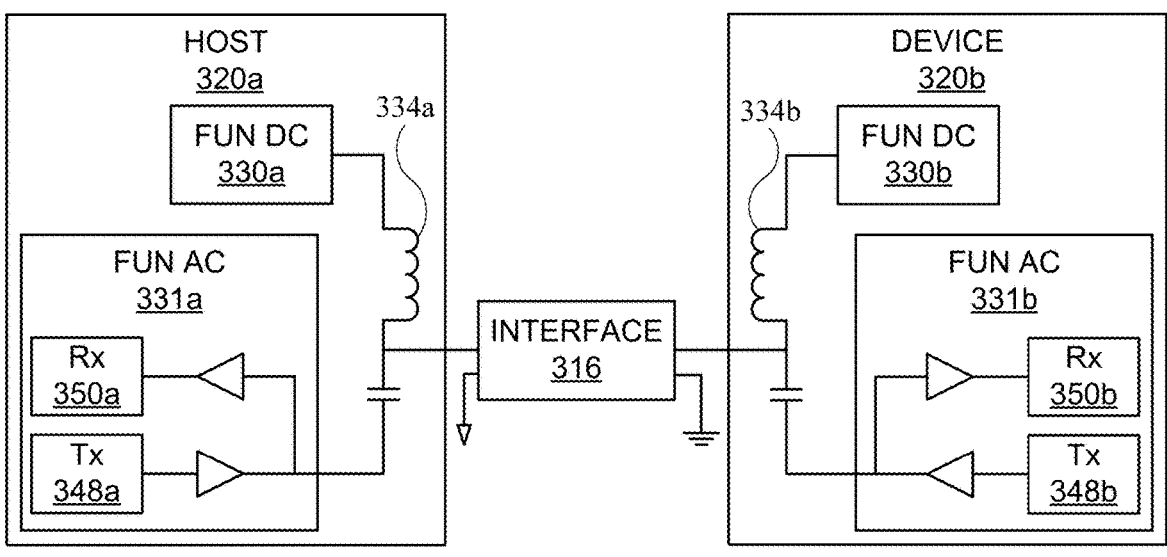
FIG. 5B, FIG. 5C, and FIG. 5D illustrate example of electrical networks, in accordance with aspects of the present disclosure.
Figure 5C:
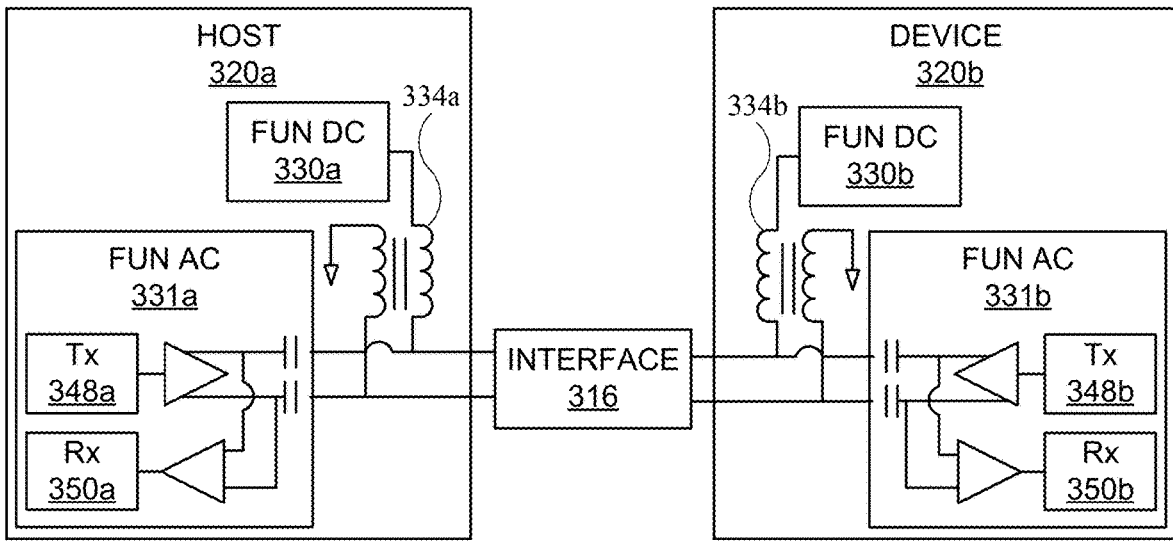
Figure 5D:
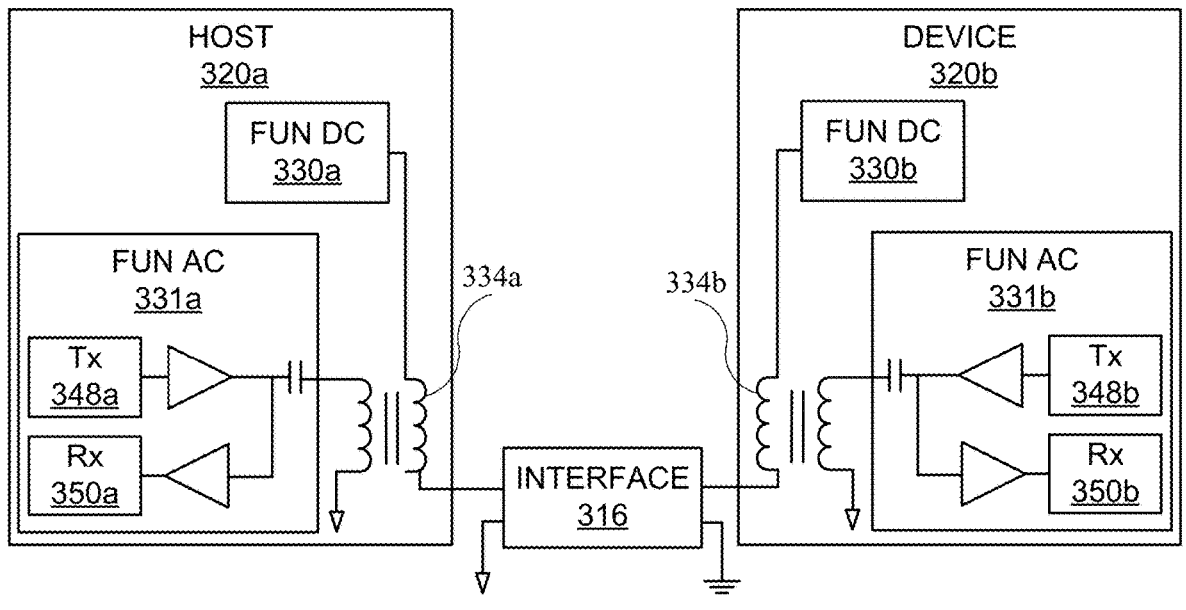

FIGS. 5B-5D include alternate exemplary network systems. The network systems shown and/or described in FIGS.

5B-5D may include at least some features shown and/or described in FIG. 5A. However, the network systems shown and/or described in FIGS. 5B-5D may be connected (e.g., electrically connected) in different manners. Referring to FIG. 5B, a single ended, non-isolated system is shown. A host 320a may include a functional bus 330a (FUN DC) and a functional bus 331a (FUN AC), with the functional bus 331a having a receiver 350a (Rx) and a transmitter 348a (Tx). The host 320a may further include a magnetic based element 334a (e.g., inductor, ferrite bead) for filtering. A device 320b may include a functional bus 330b (FUN DC) and a functional bus 331b (FUN AC), with the functional bus 331b having a receiver 350b (Rx) and a transmitter 348b (Tx). The device 320b may further include a magnetic based element 334b (e.g., inductor, ferrite bead) for filtering. In one or more implementations, an interface 316 is used to communicate power and communication data over the same signal between the host 320a and the device 320b.

Referring to FIG. 5C, a differential, non-isolated system is shown. A host 320a may include a functional bus 330a (FUN DC) and a functional bus 331a (FUN AC), with the functional bus 331a having a receiver 350a (Rx) and a transmitter 348a (Tx). The host 320a may further include a magnetic based element 334a (e.g., inductor, ferrite bead) for filtering. A device 320b may include a functional bus 330b (FUN DC) and a functional bus 331b (FUN AC), with the functional bus 331b having a receiver 350b (Rx) and a transmitter 348b (Tx). The device 320b may further include a magnetic based element 334b (e.g., inductor, ferrite bead) for filtering. In one or more implementations, an interface 316 is used to communicate power and communication data over the same signal between the host 320a and the device 320b.

Referring to FIG. 5D, a single ended, isolated system is shown. A host 320a may include a functional bus 330a (FUN DC) and a functional bus 331a (FUN AC), with the functional bus 331a having a receiver 350a (Rx) and a transmitter 348a (Tx). The host 320a may further include a magnetic based element 334a (e.g., inductor, ferrite bead) for filtering. A device 320b may include a functional bus 330b (FUN DC) and a functional bus 331b (FUN AC), with the functional bus 331b having a receiver 350b (Rx) and a transmitter 348b (Tx). The device 320b may further include a magnetic based element 334b (e.g., inductor, ferrite bead) for filtering. Based on the configuration of the magnetic based elements 334a and 334b, each of the host 320a and the device 320b may communication using transformers. In one or more implementations, an interface 316 is used to communicate power and communication data over the same signal between the host 320a and the device 320b.

Figure 6:
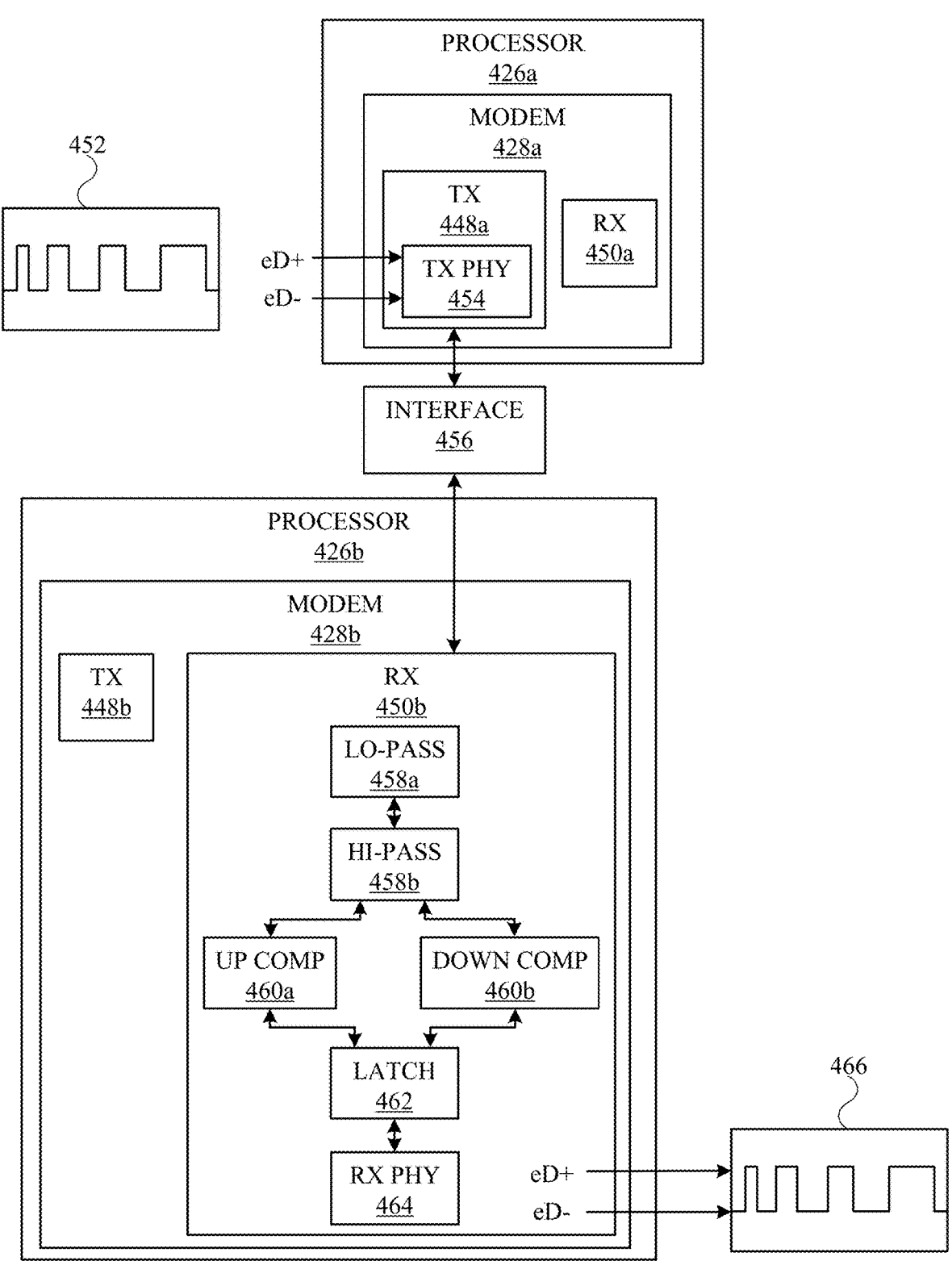
FIG. 6 illustrates a block diagram showing a device transmitting a signal to another device that replicates the transmitted signal, in accordance with aspects of the present disclosure.

Referring to FIG. 6, a block diagram showing an example data stream sent from a processor 426a to a processor 426b is shown. In particular, the data stream is transmitted from a modem 428a (of the processor 426a) to a modem 428b (of the processor 426b). The processors 426a and 426b may be installed in devices (e.g., a case and earbuds). Further, the processors 426a and 426b may include any features shown and described for the processor 227 shown in FIG. 4.

The processor 426a is designed to convert a differential signal into a single ended signal, and couple the single ended signal with power. The modem 428a may include a transmitter 448a and a receiver 450a, and the modem 428b may include a transmitter 448b and a receiver 450b. Each of the transmitters 448a and 448b may be referred to as a transmitter circuit, and each of the receivers 450a and 450b may be referred to as a receiver circuit. During operation, the transmitter 448a may receive a signal 452, which may include a differential signal from an eUSB2 data stream represented by electrical states eD+ and eD− on a respective data line. Accordingly, although not shown in FIG. 6, each of the processors 426a and 426b may include a multi-pin interface having two pins, with one designated as a signal pin (e.g., similar to the pin 238a shown in FIG. 4) and the other designated as a ground pin (similar to the pin 238b shown in FIG. 4). The electrical states eD+ and eD− may represent pin states of pins. The transmitter 448a may include a transmit physical layer 454 (TX PHY) that converts the different signal to a single ended signal, and transmits the single ended signal to an interface 456. In one or more implementations, the interface 456 provides for transfer of information that includes a combination of power and communication. Each of the modems 428a and 428b may operate in an asynchronous manner in which the modem 428a may transmit and after transmission, the modem 428b may transmit. Also, while not specially shown, the transmitter 448b may include any features and functionality as those of the transmitter 448a, and the receiver 450a may include any features and functionality as those of the receiver 450b.

The signal received by the processor 426b can be decoupled to separate communication data form power. The communication data is transmitted to the receiver 450b of the modem 428b. In order for the processor 426b to replicate the signal 452 (e.g., corresponding to the receive signal at the processor 426b), the processor 426b may include several features. For example, the modem 428b may include a low pass filter 458a (LO-PASS) and a high pass filter 458b (HI-PASS), that, collectively function as a band pass filter for the received signal. In one or more implementations, each of the low pass filter 458a and the high pass filter 458b takes the form of an amplifier (e.g., op amplifier). Accordingly, the receiver 450b may include multiple amplifiers. The modem 428b may further include a up comparator 460a (UP COMP) and a down comparator 460b (DOWN COMP) that detect an up edge from a high pulse and a down edge (representing a transition to a low pulse), respectively, of the signal after passing through from the low pass filter 458a and the high pass filter 458b. In one or more implementations, the comparators 460a and 460b function as an edge detector. The modem 428b may further include a latch 462, which may include an R-S latch. The latch 462 receives respective signals from the up comparator 460a and the down comparator 460b, and provides an output. The modem 428b may further include a receiver physical layer 464 (RX PHY) that receives the output from the latch 462. The receiver physical layer 464 generates a signal 466, representing a replication of the signal 452. Beneficially, the signal 466 is generated without digital signal processing. Moreover, the signal 466 may be generated without modulation (e.g., radio frequency modulation).

Figure 7:
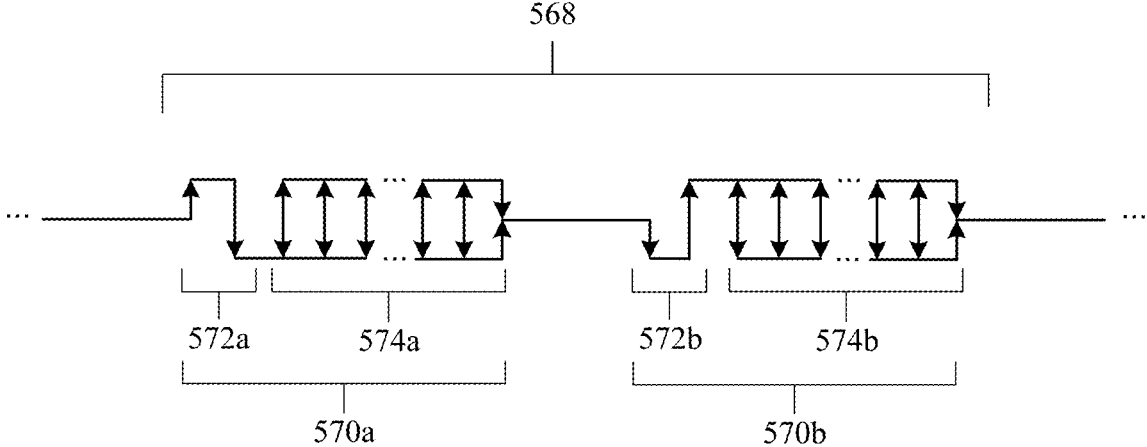
FIG. 7 illustrates a diagram showing an example data frame for synchronous bidirectional communication, in accordance with aspects of the present disclosure.

Referring to FIG. 7, an example of a data frame 568 is shown. The data frame 568 may represent a data frame generated by a device (e.g., case or earbud), as opposed to received eUSB2 data. In this regard, the data frame 568 may be generated by the processors 426a and 426b (shown in FIG. 6). The data frame 568 may be used in bidirectional communication for transfer of synchronous data between devices shown and described herein. In this regard, the data frame 568 may include a first portion 570a generated from a device (e.g., a host, a case) as well as a second portion 570b generated from another device (e.g., device, earbuds). The device generating the initial portion (e.g., first portion 570a) may be referred to as a leader, and the device generating the subsequent portion (e.g., second portion 570b) may be referred to as a follower.

Each of the first portion 570a and the second portion 570b may include encoded symbols. As a non-limiting example, 5 b/6 b encoding (a subset of 8 b/10 b encoding) may be selected. Also, the first portion 570a and the second portion 570b represent transmitted data by the leader and the follower, respectively. The first portion 570a includes frame sync data 572a sent with two unit intervals, followed by coupled data 574a representing a combination of communication data (e.g., communication data, software updates, etc.) and power. Similarly, the second portion 570b includes frame sync data 572b sent with two unit intervals, followed by coupled data 574b (similar to the coupled data 574a). The "flat line" or period of no data may be referred to as an idle time.

The coupled data 574a and the coupled data 574b may include several unit intervals (e.g., 6 to 60 unit intervals). While the data frame 568 may represent a fixed data frame with a predetermined interval, certain aspects within the data frame 568 can be varied. For example, the leader, or initiating device, can be instructed to send more symbols in the first portion 570a than that of the follower, or subsequent device, in the second portion 570b, thus the number of symbols (e.g., symbol count) may vary and the bandwidth may be allocated differently between the first portion 570a and the second portion 570b. Additionally, the respective run times can be varied. Beneficially, the data frame 568, representing synchronous transmitted communication between two devices, can be optimized. It should be noted that either a host or a device shown and described herein may be used as the leader, while the remaining device becomes the follower.

Figure 8:
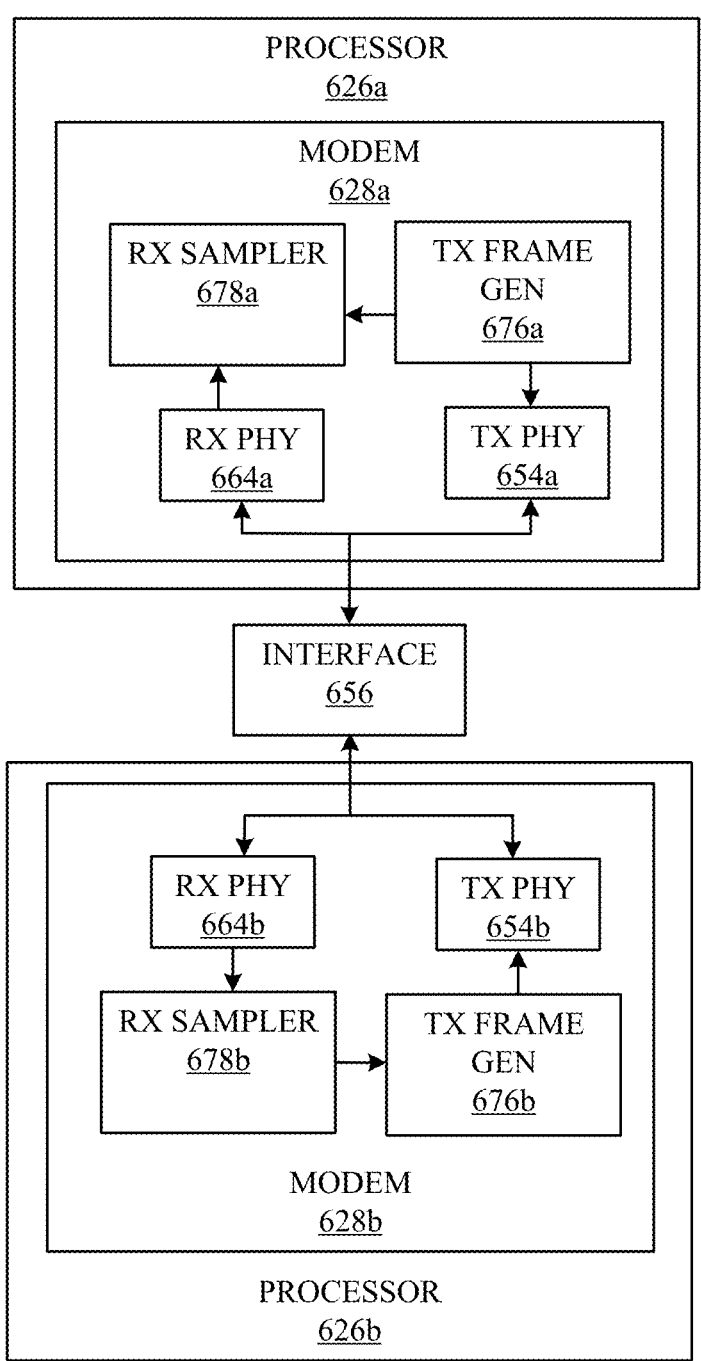
FIG. 8 illustrates a block diagram showing components for transmitting and receiving synchronous bidirectional communication, in accordance with aspects of the present disclosure.

Referring to FIG. 8, a block diagram shows components for transmitting and receiving synchronous bidirectional communication. A system may include a processor 626a to a processor 626b is shown, each of which may take the form of integrated circuits. In particular, the data stream is transmitted from a modem 628a (of the processor 626a) to a modem 628b (of the processor 626b). The processors 626a and 626b may be used in a bidirectional communication system, including synchronous communication. The processors 626a and 626b may be installed in devices (e.g., a host and a device, a case and earbuds). Further, the processors 626a and 626b may include any features shown and described for the processor 227 shown in FIG. 4.

The modem 628a and the modem 628b may include a transmitter frame generator 676a and a transmitter frame generator 676b (TX FRAME GEN), respectively. Each of the transmitter frame generator 676a and transmitter frame generator 676b functions as frame generator circuit that allow the processor 626a and the processor 626b, respectively, to generate data frames (e.g., similar to the data frame 568 shown in FIG. 7). In this regard, the transmitter frame generators 676a and 676b may generate respective portions of a data frame. The modem 628a and the modem 628b may further include a receiver sampler 678a and a receiver sampler 678b (RX SAMPLE), respectively, designed to sample received data frames. In one or more implementations, each of the receiver samplers 678a and 678b takes the form of a sampling circuit designed sample and hold an input signal (e.g., received portion of a data frame). The modem 628a and the modem 628b may further include a transmitter physical layer 654a and a transmitter physical layer 654b (TX PHY), respectively, designed to transmit data frames generated by respective transmitter frame generators. Each of the transmitter physical layers 654a and 654*b* may be referred to as a transmitter circuit. The modem 628*a* and the modem 628*b* may further include a receiver physical layer 664*a* and a receiver physical layer 664*b* (RX PHY), respectively, designed to receive and filter received signals. In this regard, each of the receiver physical layer 664*a* and 664*b* may be referred to as a receiver circuit. Each of the receiver physical layers 664*a* and 664*b* may include a high pass filter and a low pass filter, as non-limiting examples. In this regard, each of the receiver physical layers 664*a* and 664*b* may function as a filtering circuit designed to decouple a data frame. For example, the receiver physical layer 664*a* may decouple a portion of a data frame, including decoupling the communication data from power, received from the processor 626*b*. Similarly, the receiver physical layer 664*b* may decouple a portion of a data frame, including decoupling the communication data from power, received from the processor 626*a*.

Although not shown in FIG. 8, each of the processors 626*a* and 626*b* may include a multi-pin interface, with one pin designated as a signal pin (e.g., similar to the pin 238*a* shown in FIG. 4) and the other pin designated as a ground pin (e.g., similar to the pin 238*b* shown in FIG. 4). Additionally, the processors 626*a* and 626*b* may be in communication by an interface 656 by way of their respective pins. In one or more implementations, the interface 656 provides for transfer of information that includes a combination of power and communication.

As an example operation, the processor 626*a* is designated as a leader and the processor 626*b* is designated as a follower. The transmitter frame generator 676*a* may generate an initial portion (e.g., first portion 570*a* shown in FIG. 7), which is transmitted to the receiver physical layer 664*b* for filtering, and then sent to the receiver sampler 678*a* for sampling. Further, the initial portion of the data frame may include frame sync data transmitted from the transmitter frame generator 676*a* to the receiver sampler 678*a* (of the modem 628*a*), which may be used to activate and prepare the receiver sampler 678*a* to receive data generated at the processor 626*b* that will be sent to get processor 626*a* in the same data frame. Put another way, the frame sync data may provide an indication to the receiver sampler 678*a* of the second portion (e.g., that the second portion of the data frame is expected). Additionally, the frame sync data may be recovered by the receiver sampler 678*b* and transmitted to the transmitter frame generator 676*b* (of the modem 628*b*). The frame sync data may provide an indication to the transmitter frame generator 676*b* that the initial portion (e.g., first portion 570*a*) of the data frame has been received. Upon receiving the frame sync data, the transmitter frame generator 676*b* generates a subsequent portion (e.g., second portion 570*b*) of the data frame. The subsequent portion of the data frame is transmitted by the transmitter physical layer 654*b* to the modem 628*a* via the interface 656, where the subsequent portion of the data frame filtered by the receiver physical layer 664*a* and sampled by the receiver sampler 678*a*. Similar to the initial portion, the subsequent portion may also include frame sync data.

The communication scheme may offer several advantages. For example, the data frame may include communication coupled with power. Further, the use of clocks for alignment/syncing is not required based in part on the frame sync data for synchronization.

Figure 9:
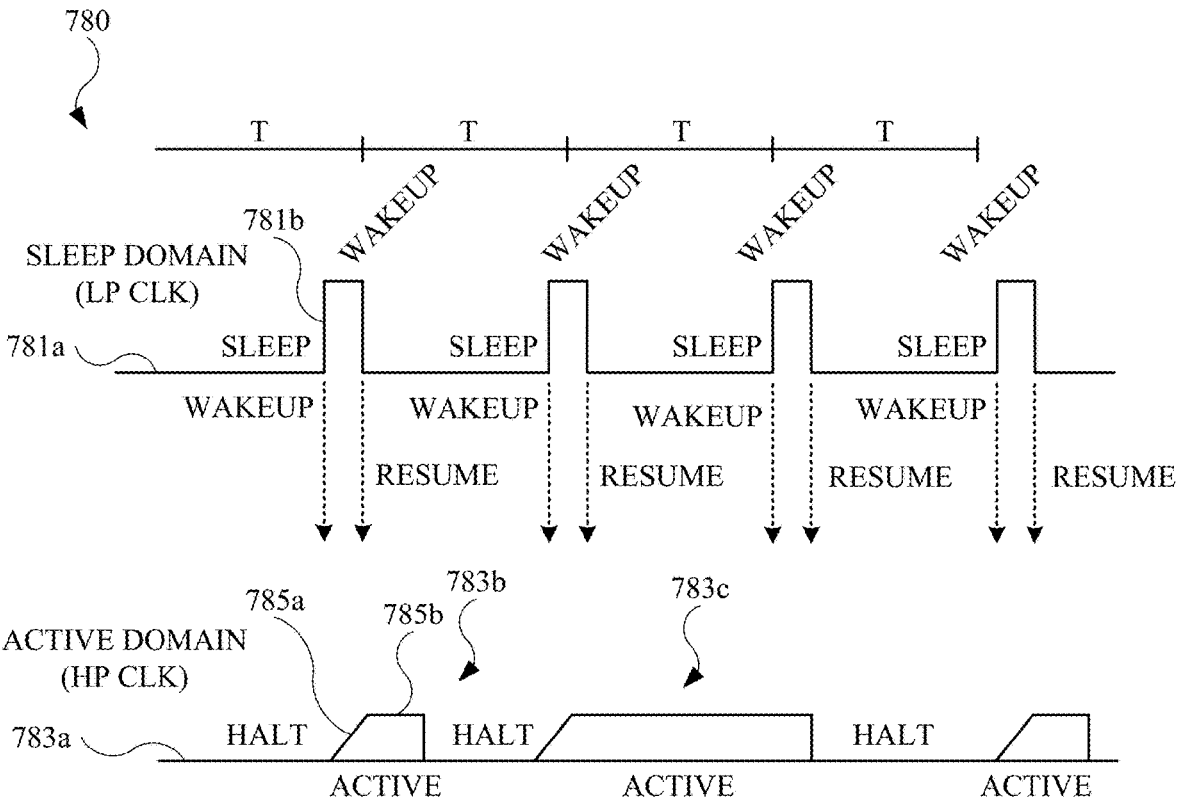
FIG. 9 illustrates a diagram showing a power management operation for a device, in accordance with aspects of the present disclosure.

Referring to FIG. 9, a diagram 780 for power management is shown. The diagram 780 includes exemplary diagrams for an LP clock circuit (e.g., 32 kHz clock) and an HP clock circuit (e.g., 125 MHz clock). In particular, the clocks may undergo respective sleep sequences when not in use (e.g., between data bursts), which may conserve energy (e.g., electrical energy stored in a power supply of a device). However, when data is transmitted, it may be advantageous to ensure the clocks not only wake but also wake with precision and synchronization. In this regard, the diagram 780 further illustrates clock synchronization for an LP clock circuit and an HP clock circuit of an apparatus (e.g., host, device).

The diagram 780 illustrates a sequence at a processor (e.g., processor 626*a* or processor 626*b* shown in FIG. 8) that is designated as a follower circuit, or follower, of a leader-follower pair of circuits. In this regard, an apparatus (e.g., host or device) may include an LP clock circuit (e.g., the low power clock circuit 246*a* shown in FIG. 4) and an HP clock circuit (e.g., high power clock circuit 246*b* shown in FIG. 4) implemented in accordance with the diagram 780.

Referring to the portion of the diagram 780 associated with the LP clock circuit, the sleep domain shows a sleep and wake cycle over a period T. For a 32 kHz clock circuit, the period T is approximately 30.5 nanoseconds (ns). As shown, a sleep domain for the LP clock circuit of the follower circuit includes a sleep phase 781*a* and a wake phase 781*b*. The sleep phase 781*a* may be associated with a low signal, while the wake phase 781*b* may be associated with a clock pulse or high signal. The wake phase 781*b* (representative of several wake phases shown) may represent a duty cycle of 1% or less.

When a data frame is received, the follower circuit uses frame sync data from the data frame to calibrate the LP clock circuit and the HP clock circuit. In this regard, the sleep sequence (SLEEP) may be adjusted (e.g., decreasing or increasing) by auto tuning the sleep phase 781*a* based on the received frame sync data. Once the sleep phase is adjusted, the wake phase of the LP clock circuit may be set. In one or more implementations, the wake phase is a fixed wake phase. Put another way, the wake phase is fixed for a predetermined time.

Referring to the portion of the diagram 780 associated with the HP clock circuit, an active domain for the HP clock circuit includes a halt phase 783*a* and an active phase 783*b* (representative of additional halt and active phases, respectively), with the active phase 783*b* including a ramp up portion 785*a* and an active portion 785*b*. The active portion 785*b* of the HP clock circuit may be associated with a fully active (e.g., fully functioning) phase of a component such as a digital core of a processor or integrated circuit. For example, the active portion 785*b* may include a portion (e.g., time interval) in which a processor or integrated circuit (e.g., processor 426*a* or processor 426*b* shown in FIG. 6, processor 626*a* or processor 626*b* shown in FIG. 6) receives, from another processor or integrated circuit (e.g., a complementary circuit of the processor 426*a* or processor 426*b*, a complementary circuit of the processor 626*a* or processor 626*b*), a first portion of a data frame and subsequently generates and transmits a second portion of the data frame to the (complementary) processor or integrated circuit.

The active phase 783*b* of the HP clock circuit may be aligned with the wake phase 781*b* of the LP clock circuit. In particular, the ramp up portion 785*a* of the active phase 783*b* may be set to align with the initiation (e.g., beginning) of the wake phase 781*b* of the sleep domain of the LP clock circuit. The wake phase 781*b* of the LP clock circuit may include a clock pulse that is sufficiently long enough to allow the active domain of the HP clock to be fully functioning at the start of each period T, thus allowing core activity of the circuit (e.g., follower circuit) to resume at the start of each new period T. Put another way, the wake phase 781*b* of the LP clock circuit may be equal to or greater than the ramp up portion 785a of the HP clock circuit. Additionally, in one or more implementations, the active phases of an HP clock circuit may be different. For example, an active phase 783c may be greater (e.g., longer duration or time interval) than the active phase 783b.

Figure 10:
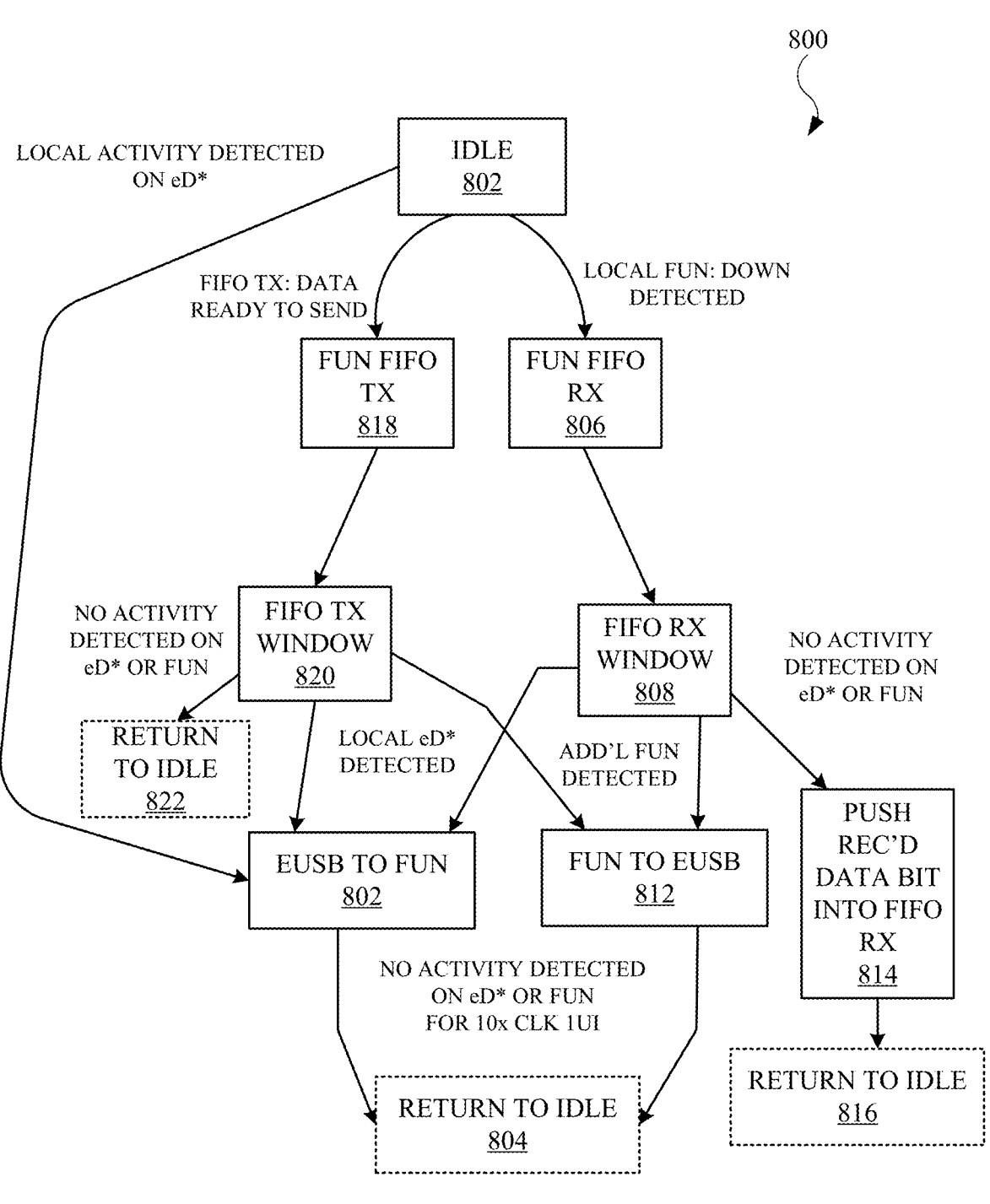
FIG. 10 illustrates a diagram of a state machine showing various states based on communication from a device, in accordance with aspects of the present disclosure.

Referring to FIG. 10, a state machine 800 for monitoring activity, such as type of data and direction of data, is shown. The activity monitored by the state machine 800 may include activity between a host (e.g., host 226 in FIG. 4) and another device with similar features as functionalities as those of the host. In this regard, the activity monitored by the state machine 800 may include activity between a host and a device with a processor (e.g., processor 426a shown in FIG. 6) and a processor (e.g., processor 426b shown in FIG. 6), respectively. Alternatively, the activity monitored by the state machine 800 may include activity between another host (e.g., host 1126 shown below in FIG. 13) and another device with similar features as functionalities as those of the host.

In some instances, the protocol running on a processor may be unknown. As a result, the source of a transmitted data packet (e.g., from a host or from a device) may be unknown. Further, the data may be indistinguishable between frame sync data or a data packet (e.g., USB burst of data). Additionally, FIFO data and high speed eUSB2 data are both bidirectional, and operate on separate asynchronous clock domains. According to one process, when USB protocol is used for communication, a portion of the USB sync data may be dropped from the USB data packet. During the time interval in which the dropped portion of the USB data sync would otherwise be transmitted, a bit of data may be sent followed by a silence window. For example, a processor (e.g., processor 227 in FIG. 4, processors 426a or 426b in FIG. 6) may take the form of an integrated circuit and generate a data bit that sent to a pin of a multi-pin interface (e.g., pins 238a and 238b in FIG. 4). This may be repeated several times.

Using a process of repeatedly sending a bit of data and remaining silent, a state machine 800 may identify which component (e.g., host or device, or modem/transmitter circuit thereof) is transmitting data and which component (e.g., remaining component between the host and the device) is receiving data. At an operation 802 (IDLE), an idle state exists. The idle state may provide a beginning or reference point. A data bit may be generated by an apparatus (e.g., host or device), followed by monitoring for additional data (e.g., data subsequent to the data bit) at a multi-pin interface. At operation 802 (EUSB TO FUN), transmission of eUSB data to a functional bus (e.g., functional bus 230b in FIG. 4) of an integrated circuit is determined based on detection of additional data, such as local eD* activity. The transmission of additional data in the form of eUSB data may be detected as clock signals at the multi-pin interface, and a determination is made that a type of communication (e.g., first type communication, eUSB data or data streams) is being transmitted. For example, a signal pin of the multi-pin interface may toggle while the initially generated data bit is transmitted to the multi-pin interface. A current state of the signal pin may be detected and subsequently transmitted over a network (e.g., electrical network). Moreover, the eUSB data may be simultaneously detected with the data bit at the multi-pin interface. This may trigger a passthrough mode for local eD* activity pin states onto the functional bus. Further, the transmitted data may include communication data and power coupled with the communication data. Also, the state machine 800 may identify which component (e.g., host or device) is transmitting the data, and also which component (e.g., device or host, respectively) is receiving the transmitted data. At operation 804 (RETURN TO IDLE), the functional bus may transition to an idle state (e.g., operation 802) if no further detected activity on the eD* (e.g., eD+ or eD−) or no further detected activity is detected for more than a predetermined inactivity time. As an example, non-activity of approximately 10 unit intervals may represent no further activity, but may vary based on specific system requirements.

From the idle state at operation 802, when a down edge (of a signal) is detected at a local functional bus, the operation proceeds to operation 806 (FUN FIFO RX) when the functional bus receives a second type communication or different type of communication, such as FIFO data (e.g., sideband data). The functional bus may detect a down edge (e.g., transmission from a high pulse to a low pulse). At operation 808, there is a FIFO transmit silence window after the transmitted FIFO data. When local eD* activity is detected, the process proceeds to operation 802, indicating the apparatus (e.g., host) that originally detected local activity (local eD*) is again detecting the local activity. Subsequently, the state machine 800 then proceeds to operation 804 as discussed above. When additional functional bus activity is detected, the process proceeds to operation 812 (FUN TO EUSB), where transmission of data from the functional bus is determined based on additional functional bus activity.

Conversely, at operation 814 (PUSH REC'D DATA BIT INTO FIFO RX), the received data is pushed into FIFO received data when no activity is detected on the eD* (e.g., eD+ or eD−) pin states of the functional bus. Further, in the absence of further detected activity, the initially transmitted data bit provided to the multi-pin interface is determined to be part of the FIFO data. The state machine 800 then proceeds to operation 816, a return to an idle state.

At operation 818 (FUN FIFO TX), the functional bus transmits FIFO data based on FIFO transmit data being ready to send. At operation 820 (FIFO TX WINDOW), there is a FIFO transmit silence window after the transmitted FIFO data. At operation 822, the functional bus returns to an idle if no further detected activity on the eD* (e.g., eD+ or eD−) pin states of the functional bus. When the functional bus determines a transmission of eUSB data based on local eD* activity, the state machine 800 again proceeds to operation 802. This may trigger a passthrough mode for local eD* activity pin states (from a multi-pin interface) onto the functional bus. In one or more implementations, a processor or integrated circuit may have data to send. In order to provide an indication to another device (of the data to send), the processor may transmit, via a transmitter circuit, a signal in the form of a high pulse followed by a low pulse. Subsequent to transmitting the signal to the other device, the processor transmits the data (e.g., eUSB data stream). The state machine 800 may subsequently proceed to operation 804, and return to idle if no further activity is detected. Alternatively, when additional functional bus activity is detected, the state machine 800 proceeds to operation 812, where transmission of data from the functional bus occurs. The state machine 800 may subsequently proceed to operation 804, and return to idle if no further activity is detected.

Figure 11:
FIG. 11 illustrates a table showing an example signal scheme for transmitting data, in accordance with aspects of the present disclosure.

Referring to FIG. 11, a table 900 provides high speed eUSB2 bus state representations. As shown, for a differential "1", the transmitter drives data in a high state and the receiver detects an up edge. Conversely, for a differential "0", the transmitter drives data in a low state and the receiver detects a down edge. Using the table 900, USB states can be mapped to determine what is transmitted over a single ended signal.

Figure 12:
FIG. 12 illustrates a graph showing an encoding scheme for full speed eUSB data, in accordance with aspects of the present disclosure.
Figure 12:
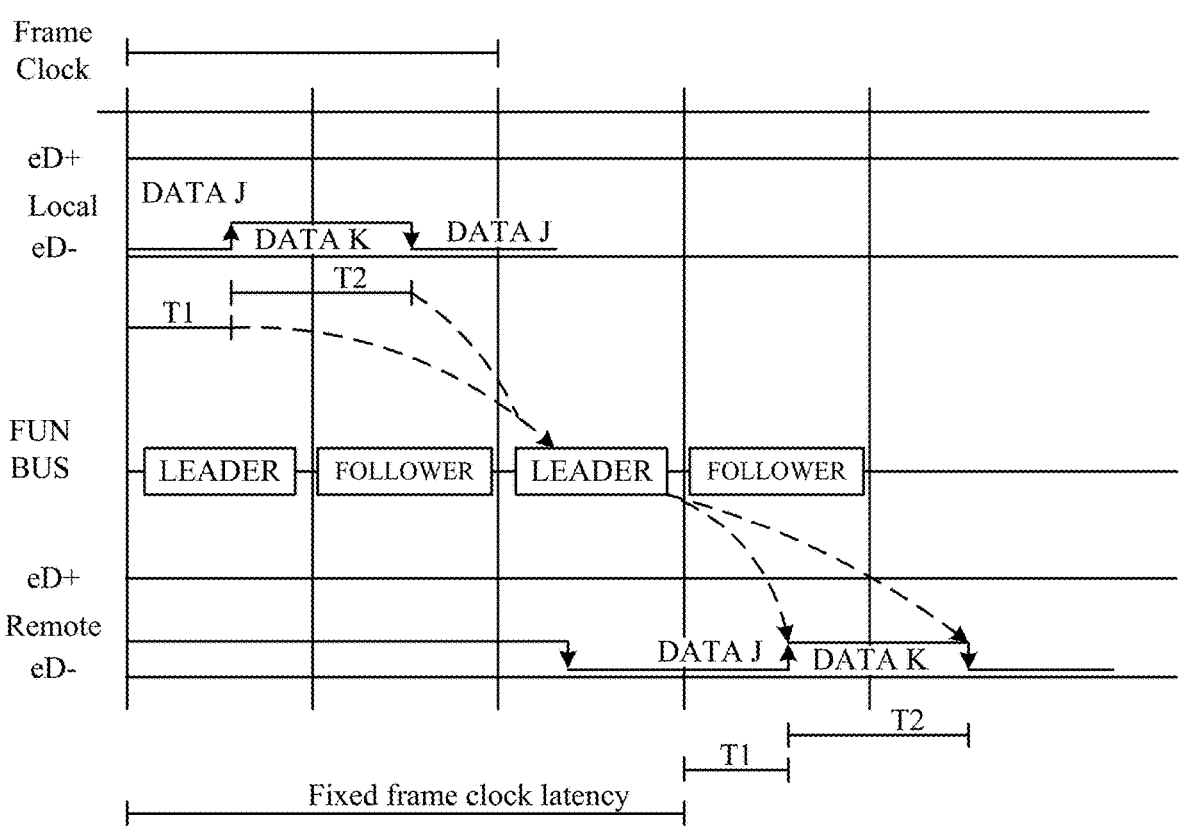

Referring to FIG. 12, a table 1000 shows encoding of full speed eUSB2 data based on sampling with a high speed clock. A plot of pin states from a local functional bus may be replicated on a remote functional bus. As shown, data J state and data K state (each representing distinct logic states for eD+ and eD− lines of eUSB2 high speed data) is plotted over a data frame. The frame rate is selected to efficiently encode the transition timing information of a maximum number of transitions which can occur during the frame interval. In the example shown, the frame rate is selected to be 6.25 Mhz, which is a frame interval of 160 ns. This 160 ns example frame interval can therefore encode a worst case 2 FS-USB transitions, which occur at an 83.33 ns ($\frac{1}{12}$ Mbaud) unit interval. Also, a J-K transition is shown, the plot shows the state changing from data J to data K. When a pin transitions, the pin transition phase information may be captured. For example, at the beginning of time T2 (or end of time T1), the J-K transition occurs and at the end of time T2, a K-J transition occurs. The phase information at each transition may be captured, and transmitted to the designated leader (in a leader-follower pair used in for transmission of a full speed eUSB2 data packet). The data can be transmitted to and replicated at a remote functional bus.

Figure 13:
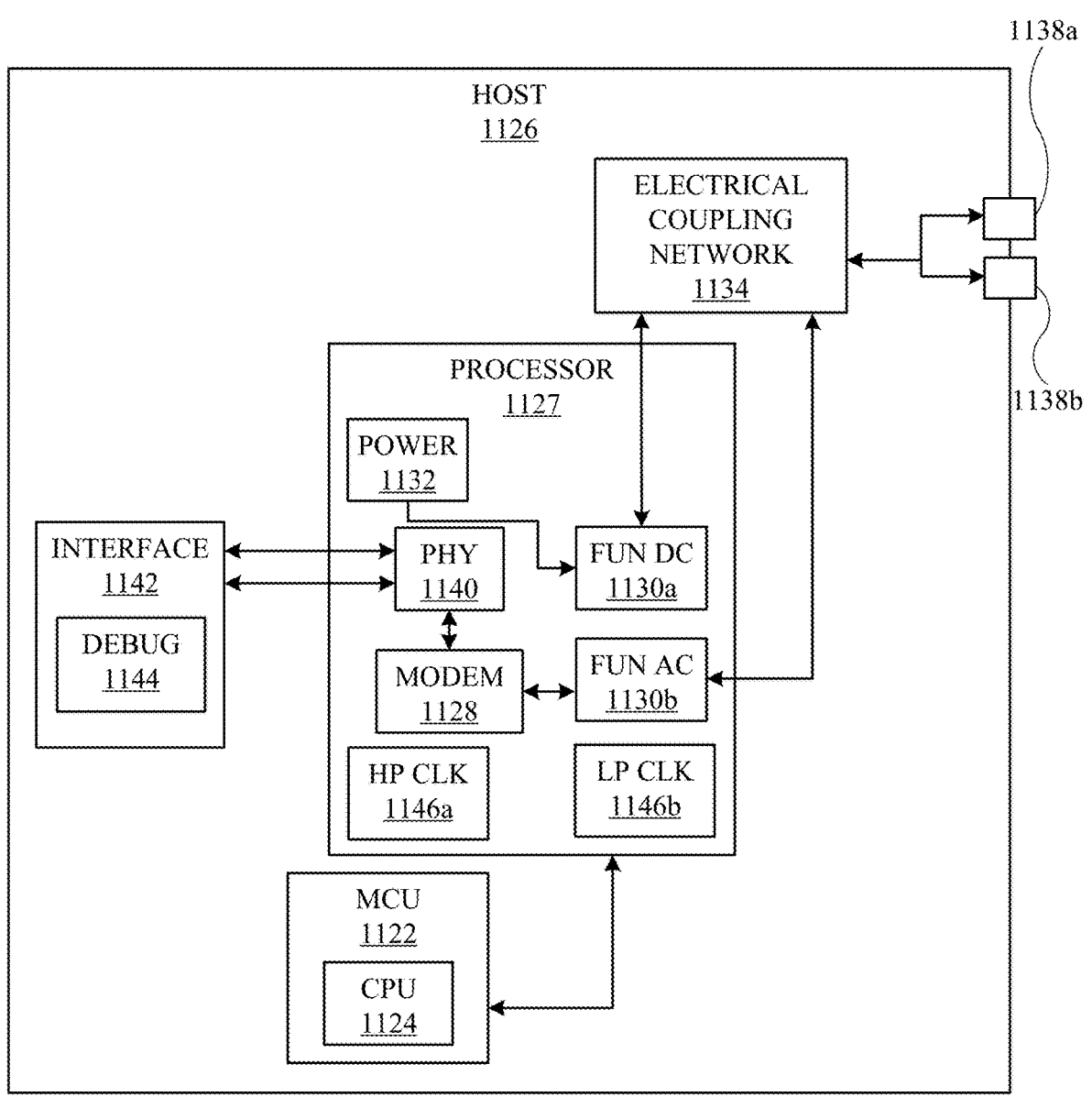
FIG. 13 illustrates a block diagram showing an alternate host and various circuitry components, in accordance with aspects of the present disclosure.

Referring to FIG. 13, a block diagram of a host 1126 is shown. In one or more implementations, the host 1126 takes the form of a case. Alternatively, in one or more implementations, the host 1126 takes the form of an earbud. Accordingly, cases and earbuds shown and/or described herein may include the components shown and described herein for the host 1126.

As shown, the host 1126 includes a microcontroller unit 1122 (MCU). The microcontroller unit 1122 may include a central processing unit 1124 (CPU) designed to manage several functions of the host 1126.

The host 1126 may further include a processor 1127 designed to manage several communication-related functions of the host 1126, including communication with earbuds (when the host 1126 takes the form of a case) or including communication with a case (when the host 1126 takes the form of an earbud). The processor 1127 may include a modem 1128 for transmitting and receiving data streams. The host 1126 may further include an electrical coupling network 1134. The processor 1127 may further include multiple functional buses. For example, the processor 1127 may provide two paths into the electrical coupling network 1134. For example, the processor 1127 may include a DC power path into the electrical network by a functional bus 1130a (FUN DC) used for transferring power between the host 1126 and a device (not shown in FIG. 13). The functional bus 1130a may provide a DC power path into the electrical network. In this regard, the processor 1127 may further include a power source 1132, which may include a DC power source. The processor 1127 may also include a functional bus 1130b (FUN AC) that provides a separate communications path for transferring information between the host 1126 and a device. The host 1126 may further include pins, including a pin 1138a (e.g., signal pin) and a pin 1138b (e.g., ground pin). In one or more implementations, the processor 1127 converts a differential signal into a single ended signal, and uses the electrical coupling network 1134 to couple the single ended signal (e.g., communication data) with power. The processor 1127 may output the single ended signal. A current state of the single ended signal may be represented by a current state of the pins 1138a and 1138b.

The processor 1127 may further include a physical layer 1140 (PHY). During operation of the host 1126, the physical layer 1140 may receive data streams from an interface 1142. The interface 1142 may be an internal component and may provide USB data, including eUSB2 data. In this regard, the physical layer 1140 may include an eUSB2 physical layer. In one or more implementations, the interface 1142 includes a debugger 1144 (DEBUG), thereby allowing the interface 1142 to provide test signals to the host 1126 for debugging. As shown, the interface 1142 is an internal device, thus allowing the host 1126 to operate in both a user mode (e.g., for audio applications) and a test mode (for testing and/or updating).

During operation, the modem 1128 receives data streams from the physical layer 1140 provides the data streams to the functional bus 1130b, while the functional bus 1130a provides power. The data streams and the power may be coupled (e.g., at the electrical coupling network 1134) and passed through the pin 1138a to another device. When the host 1126 is a case, the coupled signal is sent to the earbuds.

The processor 1127 may further include several clocks. For example, the processor may include a high power clock circuit 1146a (HP CLK) and a low power clock circuit 1146b (LP CLK), each of which may be used for clock signals. As non-limiting examples, the high power clock circuit 1146a may operate at 125 MHz and the low power clock circuit 1146b may operate at 32 kHz.

Various examples of aspects of the disclosure are described below as clauses for convenience. These are provided as examples, and do not limit the subject technology.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
a multi-pin interface comprising:
a signal pin; and a ground pin; and
an integrated circuit configured to:
receive a differential signal;
convert the differential signal to a single ended signal;
couple the single ended signal with power to form a coupled signal, wherein the signal pin configured to transmit the coupled signal; and
transmit, via the signal pin, the coupled signal.

2. The device of claim 1, wherein the integrated circuit comprises:
a first functional bus configured to provide a first communication path for the power; and
a second functional bus configured to provide a second communication path for the single ended signal.

3. The device of claim 2, wherein the first communication path is separate from the second communication path.

4. The device of claim 1, further comprising a modem comprising a transmitter configured to transmit the single ended signal to a second device.

5. The device of claim 4, wherein the modem is configured to transmit the single ended signal via the signal pin to the second device.

6. The device of claim 4, wherein the integrated circuit further comprise a physical layer configured to provide, via an interface, the differential signal to the modem.

7. The device of claim 1, wherein the signal pin is configured to provide a current state of the single ended signal.

8. A device, comprising:
a multi-pin interface; and
an integrated circuit configured to:
receive, via the multi-pin interface, a coupled signal comprising a single ended signal coupled with power, wherein the single ended signal i) is converted from a differential signal and ii) comprises a high pulse and a low pulse;
filter, based on one or more amplifiers, the coupled signal to separate the single ended signal from the power;
detect, subsequent to the high pulse, the low pulse of the single ended signal; and
provide an output based on the detected low pulse, wherein the output comprises a replication of the differential signal.

9. The device of claim 8, wherein the integrated circuit comprises an edge detector configured to detect the high pulse and the low pulse.

10. The device of claim 9, wherein the edge detector comprises:
a first comparator configured to detect the high pulse; and
a second comparator configured detect the low pulse.

11. The device of claim 9, wherein the integrated circuit further comprises a latch configured to receive, from the edge detector, the high pulse and the low pulse.

12. The device of claim 8, wherein the integrated circuit further comprises a modem configured to receive the coupled signal.

13. The device of claim 12, wherein the modem comprises a transmitter configured to transmit a signal to a second device via the multi-pin interface.

14. The device of claim 8, wherein the one or more amplifiers comprises a high pass filter and a low pass filter.

15. A system, comprising:
a first integrated circuit configured to:
convert a differential signal to a single ended signal; and
transmit, over a network, the single ended signal; and a second integrated circuit configured to:

receive, over the network, the single ended signal;

filter, based on one or more amplifiers, the single ended signal;

detect, based on the filtered single ended signal, a high pulse and a low pulse; and provide an output based on the high pulse and the low pulse, wherein the output is used to generate a replication of the differential signal.

16. The system of claim 15, wherein the first integrated circuit is configured to couple communication data with power to generate the single ended signal.

17. The system of claim 16, wherein the second integrated circuit is configured to decouple the single ended signal to separate the communication data from the power.

18. The system of claim 15, wherein the first integrated circuit is configured to transmit the single ended signal over a multi-pin interface.

19. The system of claim 18, wherein the multi-pin interface comprises:

a signal pin; and a ground pin.

20. The system of claim 15, wherein the first integrated circuit is further configured to:

provide, via a first functional bus, a first communication path for power; and provide, via a second functional bus, a second communication path for the single ended signal.

*   *   *   *   *